United States Patent
Ahuja et al.

[11] Patent Number: 6,111,884
[45] Date of Patent: Aug. 29, 2000

[54] METHOD FOR USING LOGICAL LINK CONTROL (LLC) TO ROUTE TRAFFIC WITHIN A ROUTER

[75] Inventors: Neeta Ahuja, Raleigh; John Earnest Averi, Cary; Wayne Nicholas Taylor, Durham, all of N.C.

[73] Assignee: International Business Machines Corporation, Armonk, N.Y.

[21] Appl. No.: 08/928,320

[22] Filed: Sep. 12, 1997

[51] Int. Cl.$^7$ .................................................. H04L 12/46
[52] U.S. Cl. ............................................................ 370/401
[58] Field of Search ................................. 370/401–405, 370/432

[56] References Cited

U.S. PATENT DOCUMENTS

| | | | |
|---|---|---|---|
| 4,977,499 | 12/1990 | Banning et al. | 364/200 |
| 5,684,800 | 11/1997 | Dobbins et al. | 370/401 |
| 5,740,171 | 4/1998 | Mazzola et al. | 370/401 |
| 5,825,772 | 10/1998 | Dobbins et al. | 370/401 |

*Primary Examiner*—Chau Nguyen
*Assistant Examiner*—Frederic D. Wolkow
*Attorney, Agent, or Firm*—Thomas F. Galvin; Daniel E. McConnell

[57] ABSTRACT

A method for controlling communications between link stations locally attached to a router and served by the same single thread Logical Link Control (LLC) stack. LLC generates a table for identifying all of the locally attached link stations served by the LLC and upon request from a locally attached source link station to establish a session with another destination link station, the LLC examines the table to determine if the destination link station is locally attached and served by it. If the destination link station is locally attached and served by the same LLC, the LLC deletes all standard LLC protocols normally used to inform a partner LLC concerning the state of the communication.

3 Claims, 10 Drawing Sheets

LLC LOOPBACK FSM

LINK_CLOSED (01)

| TABLE 1. INPUT CLASS: INTERNAL EVENTS | | | |
|---|---|---|---|
| INPUT | ACTION | NOTIF. TO PARTNER | NEW STATE |
| ACTIVATE_LS | ENABLE LINK STATION, VI = VB = XS =TS = VC = 0 | | DISCON-NECTED |
| DEACTIVATE_LS | LOGICAL ERROR (LOCAL) | | |
| ENTER_LCL_BUSY | LOGICAL ERROR (LOCAL) | | |
| EXIT_LCL_BUSY | LOGICAL ERROR (LOCAL) | | |
| SEND_BTU | LOGICAL ERROR (LOCAL) | | |
| SEND_XID | LOGICAL ERROR (LOCAL) | | |
| SET_ABME (TS=VC=0, VI=0) | LOGICAL ERROR (LOCAL) | | |
| SET_ADM (VI=0) | LOGICAL ERROR (LOCAL) | | |
| TEST_LINK | LOGICAL ERROR (LOCAL) | | |
| CONN_RSP | LOGICAL ERROR (LOCAL) | | |

| TABLE 2. INPUT CLASS: RECEIVED EVENTS | | | |
|---|---|---|---|
| INPUT | ACTION | NOTIF. TO PARTNER | NEW STATE |
| ALL | IGNORE FRAME | | |

FIG. 3

DISCONNECTED (02)

| TABLE 3. INPUT CLASS: INTERNAL EVENTS | | | |
|---|---|---|---|
| INPUT | ACTION | NOTIF. TO PARTNER | NEW STATE |
| ACTIVATE_LS | LOGICAL ERROR (LOCAL) | | |
| DEACTIVATE_LS | DISABLE LINK STATION | | LINK_CLOSED |
| ENTER_LCL_BUSY | VB=LB | | |
| EXIT_LCL_BUSY | VB=0 | | |
| SEND_BTU | LOGICAL ERROR (LOCAL) | | |
| SEND_XID (TS\|VC!=0, XS=IXP) | LOGICAL ERROR (LOCAL) | | |
| SEND_XID (TS=VC=0, XS=OXP) | XS=0 | XID-R(F=PX) | |
| SEND_XID (TS=VC=0, XS=IOXP) | XS=IXP | XID-R(F=PX) | |
| SET_ABME (TS=VC=0, VI=0) | VI=LIP, XS=0 | CONNECT INDICATION | LINK_OPENING |
| SET_ABME (TS=VC=0, VI=RIP) | VI=OP, XS=0 | CONNECT RESPONSE | LINK_OPENING |
| SET_ABME (TS\|VC!=0) | LOGICAL ERROR (LOCAL) | | |
| SET_ADM (VI=0) | | | |
| SET_ADM (VI=RIP) | VI=0 | DISCONNECT INDICATION | |
| TEST_LINK (XS=VC=0, TS=0) | TS=ITP | TEST-C1 | |
| TEST_LINK (XS\|VC!=0, TS=ITP) | LOGICAL ERROR (LOCAL) | | |
| TEST_LINK (XS=VC=0, TS=IOTP) | TS=ITP | TEST-R(F=PT) | |
| TEST_LINK (XS=VC=0, TS=OTP) | TS=0 | TEST-R(F=PT) | |
| CONN_RSP | LOGICAL ERROR (LOCAL) | | |

FIG. 4A

DISCONNECTED (02)

| TABLE 4. INPUT CLASS: RECEIVED EVENTS | | | |
|---|---|---|---|
| INPUT | ACTION | NOTIF. TO PARTNER | NEW STATE |
| DISCONNECT REQUEST | IH | | |
| CONNECT INDICATION | IH, VI=RIP, PF=P | | |
| CONNECT CONFIRM | IGNORE FRAME | | |
| TEST-C (TS=0\|OTP) | IH, TS=OTP, PT=P | | |
| TEST-C (TS=ITP) | IH, TS=IOTP, PT=P | | |
| TEST-C (TS=IOTP) | IH, PT=P | | |
| TEST-R0\|TEST-R1(TS=0\|OTP) | IGNORE FRAME | | |
| TEST-R1 (TS=ITP) | IH, TS=0 | | |
| TEST-R1 (TS=IOTP) | IH, TS=OTP | | |
| XID-C (XS=0\|OXP) | IH, XS=OXP, PX=P | | |
| XID-C (XS=IXP) | IH, XS=IOXP, PX=P | | |
| XID-C (XS=IOXP) | IH, PX=P | | |
| XID-R0 | IH | | |
| XID-R1 (XS=0\|OXP) | IGNORE FRAME | | |
| XID-R1 (XS=IXP) | IH, XS=0 | | |
| XID-R1 (XS=IOXP) | IH, XS=OXP | | |
| I-FRAME | IGNORE FRAME | | |
| FLOW ON/OFF | IGNORE FRAME | | |

FIG. 4B

LINK_OPENING (03)

| TABLE 5. INPUT CLASS: INTERNAL EVENTS | | | |
|---|---|---|---|
| INPUT | ACTION | NOTIF. TO PARTNER | NEW STATE |
| ACTIVATE_LS | LOGICAL ERROR (LOCAL) | | |
| DEACTIVATE_LS | LOGICAL ERROR (LOCAL) | | |
| ENTER_LCL_BUSY | VB=LB | FLOW OFF INDICATION | |
| EXIT_LCL_BUSY | VB=0 | FLOW OFF INDICATION | |
| SEND_BTU | LOGICAL ERROR (LOCAL) | | |
| SEND-XID | LOGICAL ERROR (LOCAL) | | |
| SET_ABME (TS=VC=0, VI=0) | LOGICAL ERROR (LOCAL) | | |
| SET-ADM (VI=LIP\|LRIP\|OP) | VI=0 | DISCONNECT INDICATION | DISCONNECTED |
| TEST_LINK | LOGICAL ERROR (LOCAL) | | |
| CONN-RSP | VI=OP | CONNECT CONFIRM | LINK_OPENED |

| TABLE 6. INPUT CLASS: RECEIVED EVENTS | | | |
|---|---|---|---|
| INPUT | ACTION | NOTIF. TO PARTNER | NEW STATE |
| DISCONNECT REQUEST | IH | | DISCONNECTED |
| CONNECT INDICATION (VI=OP) | IH | | |
| CONNECT INDICATION (VI=LIP\|LRIP) | IH, VI=LRIP | | |
| CONNECT CONFIRM (VI=LIP\|LRIP,VB=0) | IH, VI=ISP, TS=XS=VC=0 | | LINK_OPENED |
| CONNECT CONFIRM (VI=LIP\|LRIP,VB=LB) | IH, VI=ISP, TS=XS=VC=0 | FLOW OFF INDICATION | LOCAL_BUSY |
| CONNECT CONFIRM (VI=OP) | IGNORE FRAME | | |
| TEST-C\|TEST-R | IGNORE FRAME | | |
| XID-C\|XID-R | IGNORE FRAME | | |
| I-FRAME (VI=OP, VB=0) | IH, VI=0, RCV_BTU | | LINK_OPENED |
| I-FRAME (VI=OP, VB=LB) | IH, VI=0, QUEUE_I-FRAME | FLOW OFF INDICATION | LOCAL_BUSY |
| FLOW OFF INDICATION (VI=OP, VB=0) | IH, VB=RB, VI=0 | | REMOTE_BUSY |
| FLOW OFF INDICATION (VI=OP, VB=LB) | IH, VB=LRB, VI=0 | | LOCAL+ REMOTE_BUSY |
| FLOW ON INDICATION | IH, VI=0 | | LINK_OPENED |

FIG. 5

LINK_OPENED (04)

| TABLE 7. INPUT CLASS: INTERNAL EVENTS | | | |
|---|---|---|---|
| INPUT | ACTION | COMMANDS TO PARTNER | NEW STATE |
| ACTIVATE_LS | LOGICAL ERROR (LOCAL) | | |
| DEACTIVATE_LS | LOGICAL ERROR (LOCAL) | | |
| ENTER_LCL_BUSY | VB=LB | FLOW OFF INDICATION | LOCAL_BUSY |
| EXIT_LCL_BUSY | LOGICAL ERROR (LOCAL) | | |
| SEND_BTU | | QUEUE I FRAME | |
| SEND_XID (XS=0) | XS=IXP | XID-C1 | |
| SEND_XID (XS=IXP¦OXP) | LOGICAL ERROR (LOCAL) | | |
| SEND_XID (XS=OXP) | IH, XS=0 | XID-R(F=PX) | |
| SET_ABME (TS=VC=0, VI=0) | LOGICAL ERROR (LOCAL) | | |
| SET_ADM (VI=LI¦LRI¦RI¦OP) | | DISCONNECT INDICATION | DISCONNECTED |
| TEST_LINK (TS=0) | TS=ITP | TEST-C1 | |
| TEST_LINK (TS=ITP¦OTP) | LOGICAL ERROR (LOCAL) | | |
| TEST_LINK (TS=OTP) | IH, TS=0 | TEST-R(F=PT) | |
| CONN_RSP | LOGICAL ERROR (LOCAL) | | |

| TABLE 8. INPUT CLASS: RECEIVED EVENTS | | | |
|---|---|---|---|
| INPUT | ACTION | NOTIF. TO PARTNER | NEW STATE |
| DISCONNECT REQUEST | IH | | DISCONNECTED |
| CONNECT INDICATION | IH, VI=RIP, PT=P | | RESETTING |
| CONNECT CONFIRM | IH | | |
| TEST-C | IH, TS=OTP, PT=P | | |
| TEST-R | IGNORE FRAME | | |
| XID-C | IH, XS=OXP, PX=P | | |
| XID-R0 | IGNORE FRAME | | |
| XID-R1 | IH | | |
| I-FRAME | RCV_BTU | | |
| FLOW OFF INDICATION | IH, VB=RB | | REMOTE_BUSY |
| FLOW ON INDICATION | IH | | |

FIG. 6

LOCAL_BUSY (05)

| TABLE 9. INPUT CLASS: INTERNAL EVENTS | | | |
|---|---|---|---|
| INPUT | ACTION | COMMANDS TO PARTNER | NEW STATE |
| ACTIVATE_LS | LOGICAL ERROR (LOCAL) | | |
| DEACTIVATE_LS | LOGICAL ERROR (LOCAL) | | |
| ENTER_LCL_BUSY | LOGICAL ERROR (LOCAL) | | |
| EXIT_LCL_BUSY | VB=0 | | LINK_OPENED |
| SEND_BTU | | QUEUE I FRAME | |
| SEND_XID (XS=0) | XS=IXP | XID-C1 | |
| SEND_XID (XS=IXP‖OXP) | LOGICAL ERROR (LOCAL) | | |
| SEND_XID (XS=OXP) | IH, XS=0 | XID-R(F=PX) | |
| SET_ABME (TS=VC=0, VI=0) | LOGICAL ERROR (LOCAL) | | |
| SET_ADM (VI=LI‖LR‖IP‖OP) | | DISCONNECT INDICATION | DISCONNECTED |
| TEST_LINK (TS=0) | TS=ITP | TEST-C1 | |
| TEST_LINK (TS=ITP‖OTP) | LOGICAL ERROR (LOCAL) | | |
| TEST_LINK (TS=OTP) | IH, TS=0 | TEST-R(F=PT) | |
| CONN_RSP | LOGICAL ERROR (LOCAL) | | |

| TABLE 10. INPUT CLASS: RECEIVED EVENTS | | | |
|---|---|---|---|
| INPUT | ACTION | NOTIF. TO PARTNER | NEW STATE |
| DISCONNECT REQUEST | IH | | DISCONNECTED |
| CONNECT INDICATION | IH, VI=RIP, PT=P | | RESETTING |
| CONNECT CONFIRM | IH | | |
| TEST-C | IH, TS=OTP, PT=P | | |
| TEST-R | IGNORE FRAME | | |
| XID-C | IH, XS=OXP, PX=P | | |
| XID-R0 | IGNORE FRAME | | |
| XID-R1 | IH | | |
| I-FRAME | DSC_I-FLD | FLOW OFF INDICATION | |
| FLOW OFF INDICATION | IH, VB=LRB | | LOCAL+ REMOTE_BUSY |
| FLOW ON INDICATION | IH | | |

FIG. 7

RESETTING (6)

| TABLE 11. INPUT CLASS: INTERNAL EVENTS | | | |
|---|---|---|---|
| INPUT | ACTION | COMMANDS TO PARTNER | NEW STATE |
| ACTIVATE_LS | LOGICAL ERROR (LOCAL) | | |
| DEACTIVATE_LS | LOGICAL ERROR (LOCAL) | | |
| ENTER_LCL_BUSY | VB=LB | | |
| EXIT_LCL_BUSY | VB=0 | | |
| SEND_BTU | LOGICAL ERROR (LOCAL) | | |
| SEND_XID | LOGICAL ERROR (LOCAL) | | |
| SET_ABME | VI=OP | | LINK_OPENING |
| SET_ADM | VI=0 | DISCONNECT INDICATION | DISCONNECTED |
| TEST_LINK | LOGICAL ERROR (LOCAL) | | |
| CONN_RSP | LOGICAL ERROR (LOCAL) | | |

| TABLE 12. INPUT CLASS: RECEIVED EVENTS | | | |
|---|---|---|---|
| INPUT | ACTION | NOTIF. TO PARTNER | NEW STATE |
| DISCONNECT REQUEST | IH, VI=0 | | DISCONNECTED |
| CONNECT INDICATION | IH | | |
| CONNECT CONFIRM | IH | | |
| TEST-CITEST-R | IGNORE FRAME | | |
| XID-CIXID-R | IGNORE FRAME | | |
| I-FRAME | IGNORE FRAME | | |
| FLOW OFF INDICATION | IGNORE FRAME | | |
| FLOW ON INDICATION | IGNORE FRAME | | |

FIG. 8

REMOTE_BUSY (7)

| TABLE 13. INPUT CLASS: INTERNAL EVENTS | | | |
|---|---|---|---|
| INPUT | ACTION | COMMANDS TO PARTNER | NEW STATE |
| ACTIVATE_LS | LOGICAL ERROR (LOCAL) | | |
| DEACTIVATE_LS | LOGICAL ERROR (LOCAL) | | |
| ENTER_LCL_BUSY | VB=LRB | FLOW OFF INDICATION | LOCAL+ REMOTE_BUSY |
| EXIT_LCL_BUSY | LOGICAL ERROR (LOCAL) | | |
| SEND_BTU | | QUEUE I FRAME | |
| SEND_XID (XS=0) | XS=IXP | XID-C1 | |
| SEND_XID (XS=IXP\|\|OXP) | LOGICAL ERROR (LOCAL) | | |
| SEND_XID (XS=OXP) | XS=0 | XID-R1(F=PX) | |
| SET_ABME | LOGICAL ERROR (LOCAL) | | |
| SET_ADM | VI=0 | DISCONNECT INDICATION | DISCONNECTED |
| TEST_LINK (TS=0) | TS=ITP | TEST-C1 | |
| TEST_LINK (TS=ITP\|\|OTP) | LOGICAL ERROR (LOCAL) | | |
| TEST_LINK (TS=OTP) | TS=0 | TEST-R1(F=PX) | |
| CONN_RSP | LOGICAL ERROR (LOCAL) | | |

| TABLE 14. INPUT CLASS: RECEIVED EVENTS | | | |
|---|---|---|---|
| INPUT | ACTION | NOTIF. TO PARTNER | NEW STATE |
| DISCONNECT REQUEST | IH, VI=0 | | DISCONNECTED |
| CONNECT INDICATION | IH, VI=RIP, PT=P | | RESETTING |
| CONNECT CONFIRM | IH | | |
| TEST-C | IH, TS=OTP, PT=P | | |
| TEST-R | IGNORE FRAME | | |
| XID-C | IH, XS=OXP, PT=P | | |
| XID-R | IGNORE FRAME | | |
| I-FRAME | RCV_BTU | | |
| FLOW OFF INDICATION | IGNORE FRAME | | |
| FLOW ON INDICATION | VB=0 | | LINK_OPENED |

FIG. 9

LOCAL+REMOTE_BUSY (8)

TABLE 15. INPUT CLASS: INTERNAL EVENTS

| INPUT | ACTION | COMMANDS TO PARTNER | NEW STATE |
|---|---|---|---|
| ACTIVATE_LS | LOGICAL ERROR (LOCAL) | | |
| DEACTIVATE_LS | LOGICAL ERROR (LOCAL) | | |
| ENTER_LCL_BUSY | LOGICAL ERROR (LOCAL) | | |
| EXIT_LCL_BUSY | VB=RB | | REMOTE_BUSY |
| SEND_BTU | | QUEUE I FRAME | |
| SEND_XID (XS=0) | XS=IXP | XID-C1 | |
| SEND_XID (XS=IXP\|\|OXP) | LOGICAL ERROR (LOCAL) | | |
| SEND_XID (XS=OXP) | XS=0 | XID-R1(F=PX) | |
| SET_ABME | LOGICAL ERROR (LOCAL) | | |
| SET_ADM | VI=0 | DISCONNECT INDICATION | DISCONNECTED |
| TEST_LINK (TS=0) | TS=ITP | TEST-C1 | |
| TEST_LINK (TS=ITP\|\|OTP) | LOGICAL ERROR (LOCAL) | | |
| TEST_LINK (TS=OTP) | TS=0 | TEST-R1(F=PX) | |
| CONN_RSP | LOGICAL ERROR (LOCAL) | | |

TABLE 16. INPUT CLASS: RECEIVED EVENTS

| INPUT | ACTION | NOTIF. TO PARTNER | NEW STATE |
|---|---|---|---|
| DISCONNECT REQUEST | IH, VI=0 | | DISCONNECTED |
| CONNECT INDICATION | IH, VI=RIP, PT=P | | RESETTING |
| CONNECT CONFIRM | IH | | |
| TEST-C | IH, TS=OTP, PT=P | | |
| TEST-R | IGNORE FRAME | | |
| XID-C | IH, XS=OXP, PT=P | | |
| XID-R | IGNORE FRAME | | |
| I-FRAME | DSC_I-FLD | FLOW OFF INDICATION | |
| FLOW OFF INDICATION | IGNORE FRAME | | |
| FLOW ON INDICATION | VB=LB | | LOCAL_BUSY |

FIG. 10

METHOD FOR USING LOGICAL LINK CONTROL (LLC) TO ROUTE TRAFFIC WITHIN A ROUTER

FIELD OF THE INVENTION

The invention relates to data communications and more particularly to communication between devices directly connected to a router or the like.

BACKGROUND

Communications between devices have been by and large specified by a number of standards organizations. These standards specify protocols which devices connected to a network must observe in order to communicate over the network. The standards also impose similar restraints on network components which interconnect the communication devices.

One standard, IEEE 802.2, specifies the protocols executed by the LLC layer. These protocols must be observed by the devices or users of the network. In turn the network components must also observe these same protocols as far as they can impact the user. In general the IEEE 802.2 standard (as well as others) assumes that a calling and a called station will be using separate LLC's (one associated with each user) interconnected by a transmission media.

SUMMARY OF THE INVENTION

The invention contemplates a method for controlling communications between link stations locally attached to a router or the like and served by the same single thread Logical Link Control (LLC) stack. A table is generated for identifying all of the locally attached link stations served by the single thread LLC and upon request from a locally attached source link station to establish a session with another destination link station the LLC examines the table to determine if the destination link station is locally attached and served by it. If the destination link station is locally attached and served by the same single thread LLC, the LLC omits selected LLC protocols normally used to inform a partner LLC concerning the state of the communication.

DETAILED DESCRIPTION OF THE INVENTION

Figure 1:
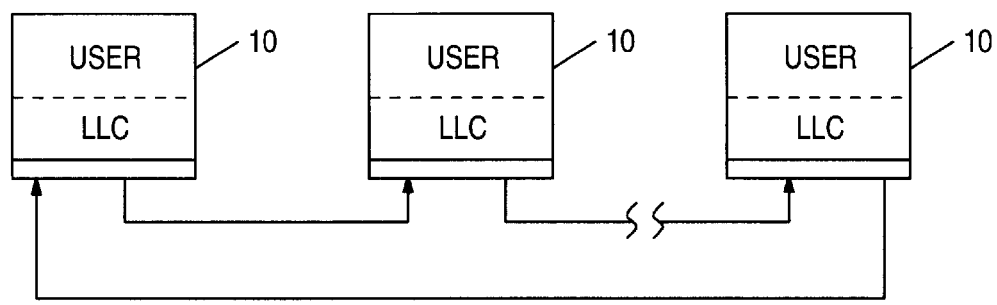
FIG. 1 is a block diagram illustrating a typical network configuration contemplated by the standards.

In FIG. 1 a plurality of user stations 10 are interconnected in a token ring network such as that specified in the IEEE 802.5 standard. Each user station has appropriate physical media and medium access control as specified in the standard. In addition each user station is provided with LLC code for executing the communication protocols specified in the IEEE 802.2 standard. The user station have been designed to operate with the LLC interface specified in the standard. Deviations, if any, must be transparent to the user stations under all contemplated operating conditions. Any exceptions would be unacceptable.

Figure 2:
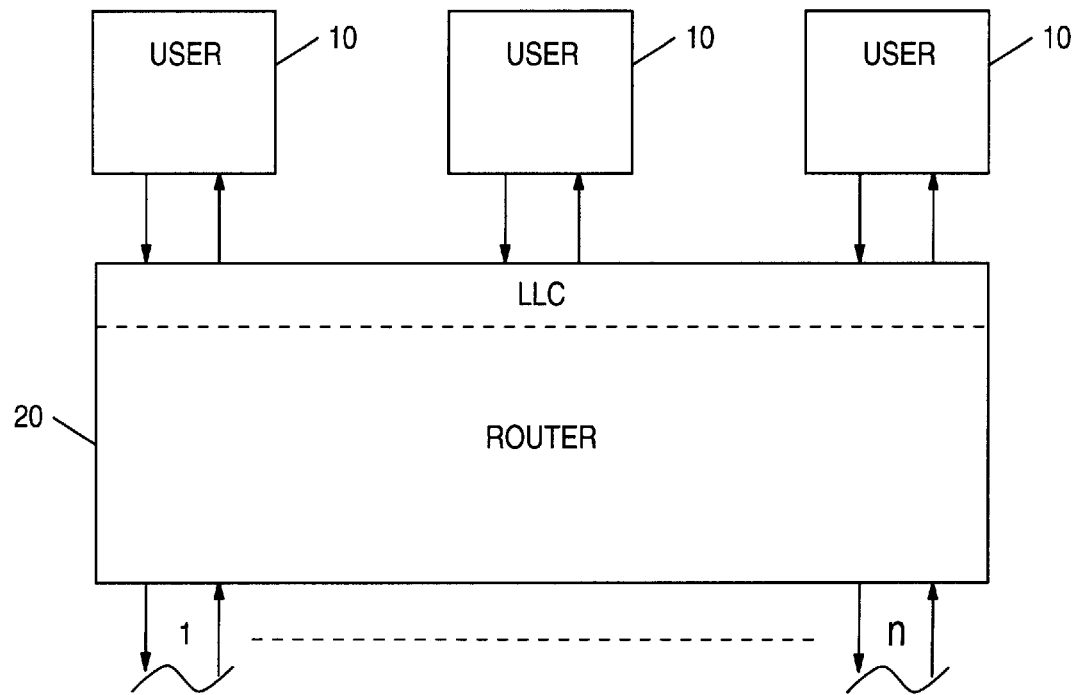
FIG. 2 is a block diagram illustrating a typical network configuration in which the invention can be used; and, FIGS. 3–10 are Finite State Machine (FSM) Tables defining the method and protocol according to the invention.

In FIG. 2 a router 20 has n ports (1–n) which are connected by network links to remote stations or other network components. In addition three user station 10 are locally connected to the router 20 and according to the invention share a common LLC which employs a novel protocol when the locally attached user stations communicate with each other using the common LLC. The novel protocol is transparent to the user stations and results in a substantial reduction of processing time thus expanding the overall capacity of the router 20 at no additional cost. In the descriptions which follow, it will be assumed that the locally connected stations 10 include all communication layers above the LLC layer described in this application.

At initialization and/or as user stations are locally attached a table, including the addresses, of the locally attached stations is generated. How this table is used will be described below. The description below will be concerned with communications between locally attached user stations only since communications between locally attached user stations and remote user stations served by a different LLC will proceed using a protocol defined in the standard followed.

In the description which follows, a locally attached user station which initiates a call to another locally attached user station will be referred to as the local link station and the called station will be referred to as the remote link station.

The locally attached user stations 10 at any given time can reside in one of eight states. These include:

01) LINK—CLOSED
02) DISCONNECTED
03) LINK—OPENING
04) LINK—OPENED
05) LOCAL—BUSY
06) RESETTING
07) REMOTE—BUSY
08) LOCAL+REMOTE—BUSY.

In state 01 the link station is inactive and the user must send an ACTIVATE—LS to enter state 02.

In state 02 the link station is recognized by the LLC and can send and receive a limited number of commands which allows the station to go to state 03 or return to state 01.

In state 03 the link stations exchange signals to establish a connection and if successful exit to state 04.

In state 04 locally connected link stations communicate information.

State 05 is entered when the local link station is busy and can no longer receive information frames.

State 06 is entered when the remote link station wants to reset the line.

State 07 is entered when the remote link station is busy.

State 08 is entered when both the local and the remote link stations are busy.

The finite state machine tables illustrated in FIGS. 3–10 define in detail all of the protocol steps under all possible operating conditions.

Listed below are terms, abbreviations and definitions of terms used in the finite state machine tables illustrated in FIGS. 3–10.

Inputs:
ACTIVATE—LS (activate link station)
this input from a user initiates activation of the link station
DEACTIVATE—LS (deactivate link station)
SET—ABME (set asynchronous balanced mode extended)
TEST—LINK (test link connection)
SEND—XID (exchange link station identification)
SET—ADM (set asynchronous disconnect mode)
ENTER—LCL—BUSY (enter local station busy condition)
EXIT—LCL—BUSY (leave local station busy condition)
SEND—BTU (send basic transmission unit)

CONN—RSP (connection response).
Variables:
Vi (initialization state)
Xs (exchange identification information status)
Ts (link test status)
Vb (busy state status)
Predicate Conditions:
For the variable Vi:
Lip (local initialization pending)
Rip (remote initialization pending)
LRip (local and remote initialization pending)
Op (operational mode pending)
ISp (I/S format frame pending)
For the variable Xs:
IXp (incoming XID response pending)
OXp (outgoing XID response pending)
IOXp (incoming and outgoing XID response pending)
For the variable Ts:
ITp (incoming test response pending)
OTp (outgoing test response pending)
IOTp (incoming and outgoing test response pending)
For the variable Vb:
Lb (local busy)
Rb (remote busy)
LRb (local and remote busy)
Other abbreviations used in the finite state machine tables:
IH (inform higher authority)
Pf (value of P bit in last received command, except XID or TEST commands
Pt (value of P bit in last TEST command received)
Px (value of P bit in last XID command received)
Vc stacked command status.

Inactive locally attached link stations are in state 01. If an inactive link station wants to establish a session with another locally attached link station it sends an ACTIVATE—LS input to the LLC. Also included with the input are the address (SA) of the link station, the address (DA) of the locally connected link station it wishes to establish a session with and the Service Access Point identities of the source (SSAP) and destination (DSAP) link stations.

The addresses and the SAP's identify the link stations. With this information and the contents of the table described above the LLC can establish when both the "local" and "remote" link stations are in fact locally attached and served by the same LLC. In this instance, the protocol executed by the LLC will be in accordance with the invention and follow the sequences specified in the finite state machine tables.

Each state has two tables one for internal events associated with the local link station and the other for received events associated with the remote link station. The tables have four columns. The first lists inputs, the second lists action taken as a result tables have four columns. The first lists inputs, the second lists action taken as a result of the input, the third lists notifications sent to the partner link station and the fourth lists the new state the link station goes to based on the input and predicates associated with the variables.

For example, when the LLC receives the ACTIVATE—LS from a link station the station moves to state 02 where it is permitted to transmit and receive a limited number of items. Among these are the TEST and XID frames. These are preceded by the TEST—LINK and SEND—XID inputs to LLC. After the stations successfully complete this process (this process is the same as specified in the standard) one of the link stations will send LLC a SET—ABME input.

It is at this point that the LLC deviates from the protocol specified in the standard. After receipt of SET—ABME, the LLC will send the partner link station either a Connect Indication or a Connect Response depending on the predicate of Vi. The predicate Rip indicates that a response to initialization is pending and the appropriate notification is Connect Response. If Vi is 0 then the Connect Indication is returned to the partner. At this time the link station providing the SET—ABME input moves to state 03. The return of Connect Indication causes Vi for the other station to go to Rip and receipt of SET—ABME from that station will cause a Connect Response to be sent to the first link station and both stations are now in state 03 LINK—OPENING (see tables 3 and 4).

The link station leave LINK—OPENING state (03) and go to LINK—OPENED state (04) when each issues a CONN—RSP to the LLC. In this state the link stations can exchange information. In addition to the above the protocol differs from the standard in several significant areas.

As the LLC receives blocks of information from one station for delivery to the other, they are passed directly to the destination station. Under conventional protocols these blocks would be encapsulated in a transmission frame by the source LLC before transmission to the destination LLC which includes a substantial amount of processing by the LLC's serving each end of the session. Since a single thread LLC serves both the source and destination link stations and the block of data does not leave the router the frame structure including block checks for error detection can be eliminated resulting in a substantial saving in processing at the router level.

Another significant improvement occurs in the execution of flow control. If a link station can not accept additional data, it issues a ENTER—LCL—Busy to LLC which places the link station in the LOCAL—BUSY state 05. LLC sends a Flow off indication to the partner and this causes the partner to enter the REMOTE—BUSY state 07 (see tables 7 and 8 of the LINK—OPENED state 04. The LOCAL+ REMOTE—BUSY state 08 is entered when both link stations cannot accept data.

The RESETTING state 06 is entered when a Connect Indication is received in states 04, 05, 07 and 08. This takes place when a link station needs to restart the link.

We claim:

1. In a data communication system including a network component having at least two link stations locally attached thereto and a single thread Logical Link Control (LLC) stack serving the two or more locally attached link stations, a method for controlling data communication between any of the locally attached link stations comprising the steps:

generating a table for identifying all of the locally attached link stations served by the single thread LLC;

upon request from a locally attached source link station to establish a session with another destination link station examining the table to determine if the destination link station is locally attached and served by the same single thread LLC; and, if the destination link station is locally attached and served by the same single thread LLC, omitting selected LLC protocols normally used to inform a partner LLC concerning the state of the communication.

2. The method set forth in claim 1 in which the protocols eliminated include formats and supervisory messages.

3. The method set forth in either claim 1 or 2 in which information blocks received from one link station are passed directly to the other link station by the single thread LLC without further processing.

* * * * *